(12) United States Patent
Vogel et al.

(10) Patent No.: US 8,094,218 B2
(45) Date of Patent: Jan. 10, 2012

(54) IMAGE SENSOR CIRCUIT HAVING DIFFERENTIAL SIGNAL PATH, DIFFERENTIAL ANALOG-TO-DIGITAL CONVERTER AND DIFFERENTIAL SIGNAL OFFSETTING MEANS

(75) Inventors: Patrick Vogel, Paderborn (DE); Steffen Lehr, Villingen-Schwenningen (DE); Heinrich Schemmann, Villingen-Schwenningen (DE); Sabine Roth, Moenchweiler (DE); Petrus Gijsbertus Maria Centen, Goirle (NL); Jeroen Rotte, Breda (NL); Ruud Van Ree, Breda (NL); Neil Mallory, Hull (DE)

(73) Assignee: Thomson Licensing, Issy-les-Moulineaux (FR)

( * ) Notice: Subject to any disclaimer, the term of this patent is extended or adjusted under 35 U.S.C. 154(b) by 86 days.

(21) Appl. No.: 12/227,581

(22) PCT Filed: May 22, 2007

(86) PCT No.: PCT/EP2007/054958
§ 371 (c)(1),
(2), (4) Date: Oct. 6, 2009

(87) PCT Pub. No.: WO2007/135153
PCT Pub. Date: Nov. 29, 2007

(65) Prior Publication Data
US 2010/0265371 A1    Oct. 21, 2010

(30) Foreign Application Priority Data

May 23, 2006  (EP) .................................... 06300509

(51) Int. Cl.
*H04N 5/335* (2011.01)
(52) U.S. Cl. ......... 348/294; 348/300; 348/308; 348/317
(58) Field of Classification Search .................. 348/294, 348/300, 307, 318
See application file for complete search history.

(56) References Cited

U.S. PATENT DOCUMENTS

| | | | |
|---|---|---|---|
| 5,565,916 A * | 10/1996 | Katayama et al. | 348/321 |
| 6,166,367 A | 12/2000 | Cho | |
| 6,788,340 B1 * | 9/2004 | Chen et al. | 348/229.1 |
| 6,952,240 B2 * | 10/2005 | Gower et al. | 348/678 |

(Continued)

FOREIGN PATENT DOCUMENTS
EP    1115244    7/2001

OTHER PUBLICATIONS
Search Report Dated Aug. 13, 2007.

*Primary Examiner* — Tuan Ho
*Assistant Examiner* — Kent Wang
(74) *Attorney, Agent, or Firm* — Myers Wolin, LLC

(57) ABSTRACT

An image sensor circuit comprises at least one pixel cell for providing an output signal which is variable according to illumination of said pixel cell between a maximum and a minimum level, an analogue-to-digital converter for converting output signals from said pixel cell into digital data, and an offset signal source for providing an offset signal having a level between said maximum and minimum levels. The analogue-to-digital converter is fully differential and is connected to said pixel cell and to said offset signal source.

12 Claims, 7 Drawing Sheets

U.S. PATENT DOCUMENTS

| | | |
|---|---|---|
| 7,486,322 B2 * | 2/2009 | Shinotsuka et al. .......... 348/308 |
| 7,528,878 B2 * | 5/2009 | Sato et al. ...................... 348/317 |
| 2004/0095490 A1 * | 5/2004 | Huang et al. .................. 348/294 |
| 2004/0141079 A1 * | 7/2004 | Yamaguchi et al. .......... 348/308 |
| 2004/0169750 A1 * | 9/2004 | Miyahara et al. ............. 348/294 |
| 2004/0227831 A1 * | 11/2004 | Storm et al. ................... 348/294 |
| 2005/0151868 A1 | 7/2005 | Fraenkel et al. |
| 2006/0001750 A1 * | 1/2006 | Mizuguchi et al. ........... 348/294 |

* cited by examiner

IMAGE SENSOR CIRCUIT HAVING DIFFERENTIAL SIGNAL PATH, DIFFERENTIAL ANALOG-TO-DIGITAL CONVERTER AND DIFFERENTIAL SIGNAL OFFSETTING MEANS

CROSS-REFERENCE TO RELATED APPLICATIONS

This application claims the benefit, under 35 U.S.C. §365 of International Application PCT/EP2007/054958, filed May 22, 2007, which was published in accordance with PCT Article 21(2) on Nov. 29, 2007 in English and which claims the benefit of European patent application No. 06300509.4, filed May 23, 2006.

FIELD OF THE INVENTION

The present invention relates to image sensor circuits, in particular to CMOS image sensor circuits.

BACKGROUND OF THE INVENTION

Camera systems often use CCD image sensors for reasons of better image quality, in particular with respect to noise and dynamic range, when compared to other image capturing methods. Current developments on CMOS image sensors show improvements in this type of sensors. Further, CMOS sensors have significant advantages in production, as they can be made using the same techniques that are used for signal processing. This allows for integrating the image sensor and at least part of the signal processing circuitry into one device, thus bringing significant reductions in costs. Further, CMOS image sensors can provide higher field or frame rates, which is important for capturing fast movements.

CMOS image sensors for digital camera applications are generally designed and produced following standard CMOS processes. Additional pixel process steps are added. The use of analogue IPs, or building blocks or models, in an IC design like a CMOS image sensor for digital camera applications can significantly shorten the development time and reduce development costs compared to customized circuit design.

Process variances and mask tolerances are the main reason for mismatches in the performance and electrical behaviour between pixel cells of one sensor. Known effects resulting thereof are, inter alia, the variation of the dark voltage, or of the reset voltage of the pixel. The dark voltage or reset voltage is the voltage level a pixel assumes after a reset pulse charges the capacitive node of its photodiode to a reset level e.g. a high level. Starting from that voltage the capacitive node is discharged by the photodiode during the exposure time. The voltage at the end of the exposure time is called the bright or video voltage and corresponds to the illumination of the pixel. The absolute level of this voltage is correlated with the dark level of the pixel at the beginning of the exposure time. It is to be noted that the term voltage is used interchangeably with the term signal throughout this specification, unless otherwise indicated.

CMOS imagers use analogue-to-digital converters, or A/D-converters, for converting an analogue signal into a digital signal. Standard IPs or building blocks for A/D converters are usually adapted to an input voltage range which is fully differential. The term "fully differential" is used in the sense that the positive and also the negative input of the differential A/D converter may vary between the same high voltage and low voltage limits independently from each other. That is to say, differential A/D converters can also accept an inverted signal, in which the signal at the negative input is higher than that at the positive input. The full resolution at the output of the ADC can only be achieved when the full differential voltage range is used at the inputs.

If a CMOS image sensor pixel cell is reset after illumination, its output voltage is set to the reset level, corresponding to the dark value of the pixel. The reset level typically is a high level compared to the voltage level of a fully exposed pixel. The reset level is stored in a capacitance, which may also be a parasitic capacitance or a blocking layer capacitance of a p-n-junction. After exposure of the light sensitive element of the pixel this voltage level is reduced to lower values proportional to the light intensity integrated during exposure, resulting in the bright value. These two output values, the dark value and the bright value of the pixel cell, are available for further signal processing. They are not fully differential, since the voltage corresponding to the dark value is always higher than or equal to the voltage corresponding to the bright value. It is recalled that fully differential in the sense of the invention corresponds to signals independently assuming values between the same high and low signal values. In state-of-the-art CMOS image sensors, as was stated above, the bright value is always tied to the dark value. Therefore, both signals are not independent from each other. As a result, only half of the voltage range of a standard differential amplifier or differential A/D converter can be used. The effective resolution is reduced by 2.

SUMMARY OF THE INVENTION

It is desirable to use standard differential A/D converter designs in CMOS image sensors, which A/D converters have full resolution for input signals at the positive and negative inputs that can unrestrictedly assume each value of the input signal range.

According to the present invention, this object is achieved by an image sensor comprising at least one pixel cell for providing an output signal which is variable according to illumination of said pixel cell between a maximum and a minimum level, and an analogue-to-digital converter for converting output signals from said pixel cell into digital data, and an offset signal source for providing an offset signal having a level between said maximum and minimum levels, the analogue-to-digital converter being fully differential and being connected to said pixel cell and to said offset signal source.

The analogue-to-digital converter may have a first input port for receiving the output signal from the pixel cell, and a second input port for receiving the offset signal.

Alternatively, the analogue to digital converter may have an input port connected to adding circuitry for receiving a sum of the output signal from the pixel cell and the offset signal.

According to a preferred embodiment, the offset signal is a differential signal, and the analogue-to-digital converter has a first input port connected to adding circuitry for receiving a sum of the output signal from the pixel cell and the first level of the offset signal and a second port for receiving a second level of the offset signal. Further, a calibrating pixel cell may be provided for providing an output signal at one of said maximum and minimum levels and adding circuitry for adding the output signal of the calibrating pixel cell to the offset signal supplied to said second input port.

The pixel cell providing the variable output signal and the calibrating pixel cell may be a same pixel cell, which is used in a time-multiplex manner, or they may be closely adjacent on the CMOS substrate, so that their dark voltages are closely similar.

The adding circuitry may comprise a passive capacitance network.

Preferably, a differential buffer amplifier is placed between said pixel cell and said offset signal source on the one hand, and said analogue-to-digital converter, on the other, for adapting impedances.

According to a first particular embodiment of the invention, the image sensor circuit further comprises a storage capacitor associated to each pixel cell for storing an output signal of said pixel cell, and a bus bar, wherein the passive capacitance network comprises a first capacitor located in each conductor of said bus bar between the storage capacitor and an output end of the bus bar and a second capacitor connected between said output end and the offset signal source. Using these first and second capacitors, a voltage level corresponding to a sum of pixel cell output signals and offset signals can be obtained at the output end of the bus bar.

According to a second embodiment, there is provided a storage capacitor associated to each pixel cell for storing an output signal of said pixel cell, a bus bar having a capacity, and a switch assembly for connecting a conductor of said bus bar either to the storage capacitor or to the offset signal source. By first pre-charging the capacity of the bus bar using the offset signal, and then connecting the bus bar to the storage capacitor, a voltage level is obtained on the bus bar, which is a weighted sum of offset and pixel output signals.

According to a further embodiment, there are provided a storage capacitor associated to each pixel cell for storing an output signal of said pixel cell, an offset capacitor for storing said offset signal, a bus bar and a switch assembly for connecting said storage and offset capacitors simultaneously to said bus bar. By first storing pixel output and offset signals in these capacitors and then connecting them to the bus bar, again, a weighted sum of pixel cell output and offset signals is obtained on the bus bar.

To this effect, a switch assembly may be provided which is adapted connect a same electrode of the offset capacitor either to the offset signal source or to the bus bar, or, alternatively, the switch assembly may comprise a switch for connecting a first electrode of the offset capacitor to the offset signal source, a second electrode of the offset capacitor being connected to the bus bar.

According to still another embodiment, there is provided a storage capacitor associated to each pixel cell for storing an output signal of said pixel cell, and a switch assembly for connecting a first electrode of said storage capacitor to the pixel cell and for connecting a second electrode of it to the offset signal source. By connecting the second electrode to the offset signal source, offset correction may be carried out directly in the storage capacitor.

Further features and advantages of the invention will become apparent from the subsequent description of embodiments thereof referring to the appended figures.

DETAILED DESCRIPTION OF THE INVENTION

Figure 1:
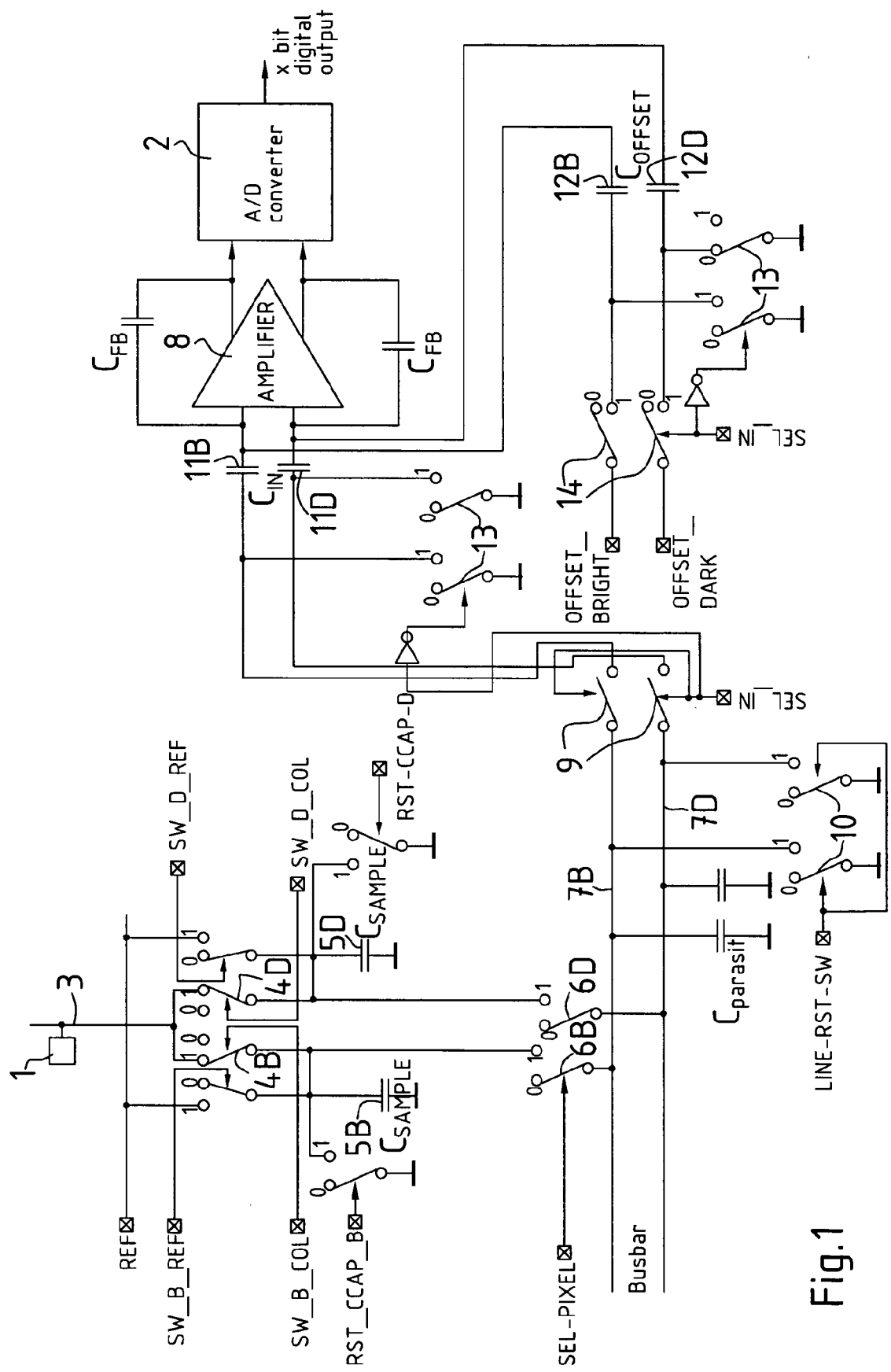
FIGS. 1 to 6 are circuit diagrams of image sensor circuits according to different embodiments of the invention.

The block diagram in FIG. 1 shows a readout path from a pixel cell 1 to an AD converter 2. The pixel cell 1 is part of a pixel cell matrix of a CMOS imager having its cells arranged in a plurality of rows and columns. A plurality of pixel cells 1 is connected to a same column line 3, one of which is activated at a given time by a row decoder not shown, to output a signal to column line 3. At the end of column line 3, there are two switches, 4B, 4D for selectively connecting the output of the pixel cell 1 to one of storage capacitors 5B, 5D, respectively. If pixel cell 1 is read out after having been illuminated for some time, a control signal SW_B_COL=1 is applied to switch 4B, causing storage capacitor 5B to sample the output voltage of pixel cell 1, further referred to as the bright voltage level. Then, a reset signal, not shown, sets the pixel cell 1 to an initial condition corresponding to a non-illuminated state. The resulting output signal of pixel cell 1 is sampled to storage capacitor 5D by applying control signal SW_D_COL=1 to switch 4D, causing it to connect pixel cell 1 to storage capacitor 5D.

Column selection switches 6B, 6D are provided between the storage capacitors 5B, 5D and respective conductors 7B, 7D of a bus bar. The bus bar is connected to a plurality of column lines, not shown, of the pixel cell matrix by switch and capacitor networks as described above, and the column select switches 6B, 6D are controlled to output stored signals from storage capacitors 5B, 5D associated to one of said columns at a time to the bus bar.

The bus bar extends along an edge of the pixel cell matrix and has its two conductors 7B, 7D connected to a different buffer amplifier 8. Outputs of the buffer amplifier 8 are connected to fully differential AD converter 2.

Prior to outputting the signals stored in storage capacitors 5B, 5D by closing switches 6B, 6D, parasitic capacities $C_{parasit}$ of the bus bar conductors 7B, 7D are discharged to ground via switches 10 controlled by a signal LINE_RST_SW. For reading out the storage capacitors 5B, 5D, the switches 6B, 6D are closed, charging the parasitic capacities and input capacitors 11B, 11D placed in each bus bar conductor 7B, 7D in front of buffer amplifier 8.

Two offset signals OFFSET_BRIGHT, OFFSET_DARK are connected to the inputs of buffer amplifier 8 via offset capacitors 12B, 12D, in parallel to input capacitors 11B, 11D. During the reset phase of pixel cell 1 (SEL_IN=0), the offset and input signals are disconnected from their respective offset and input capacitors 12B, 12D, 11B, 11D. The electrode of input capacitors 11B, 11D, not connected to buffer amplifier 8 is connected to ground via switches 13. During the amplification phase (SEL_ID=1) a differential offset signal present at offset signal terminals is connected via switches 14 to the offset capacitors 12B, 12D. The pixel signal present on the bus bar is connected to input capacitors 11B, 11D via switches 13. The result is an offset shifted signal from pixel cell 1 at the input of switch capacitor amplifier 8. The differential output voltage of the switch capacitor amplifier 8 is given by $$\Delta V_{OUT}=(V_{DARK}-V_{BRIGHT})*(C_{SAMPLE}+C_{PARASIT}+C_{IN}))*C_{FB}/C_{IN}+(V_{OFFSET\_DARK}-V_{OFFSET\_BRIGHT})*C_{FB}/C_{OFFSET}.$$

Figure 2:
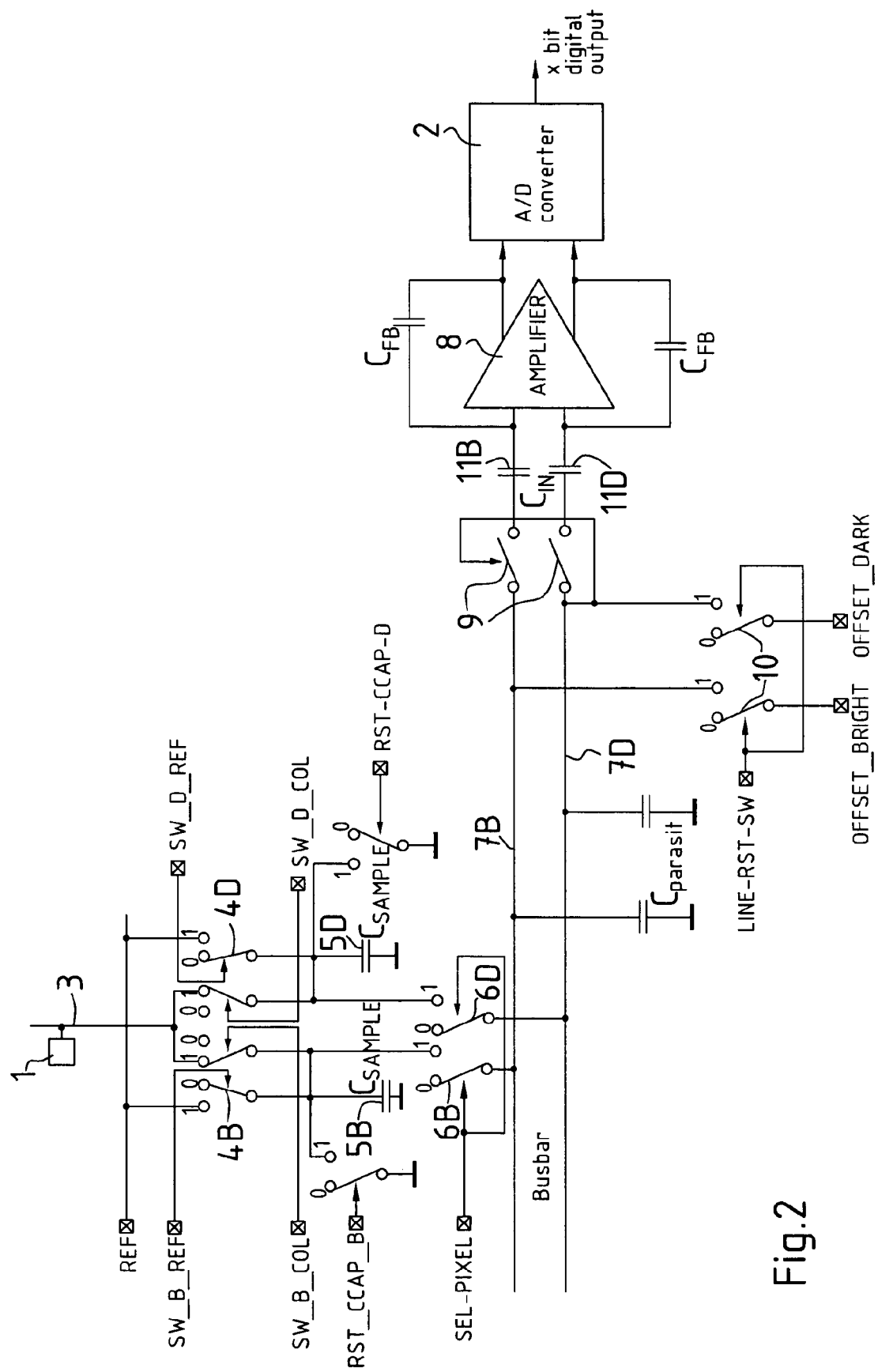

Another embodiment is described in FIG. 2. As far as appropriate, components of this embodiment and the subsequent ones that are similar to components of the first embodiments are given the same reference numerals as in FIG. 1 and are not described again.

In contrast to the example described in FIG. 1, switches 10 are not grounded but connected to the differential offset voltages OFFSET_BRIGHT, OFFSET_DARK, and the bus bar conductors 7B, 7D and their parasitic capacitances $C_{PARASIT}$ are not connected to GND during reset. When a signal at control line LINE_RST_SW=1 closes the switches 10B, 10D, the parasitic capacitances are loaded with the differential offset voltages OFFSET_BRIGHT, OFFSET_DARK. During the next phase SEL_PIXEL closes switches 6B, 6D, thus connecting the signals for the dark and bright voltages stored in respective storage capacitors 5B, 5D to the bus bar conductors 7B, 7D. A charge distribution is resulting in a common voltage on the whole capacitive node. The resulting voltage difference between the bus bar conductors 7B, 7D corresponds to the offset shifted voltage of the bright and of the dark value.

This embodiment eliminates the need for additional offset capacitances at the input of the switch capacitance amplifier 8. This reduces the area required and eliminates an additional noise source to the input of the amplifier 8. The voltage gain of this approach is as high as in the example shown in FIG. 1, because no extra capacitance for offset is needed. The differential output voltage of the switched capacitor amplifier is given by $$\Delta V_{OUT} = (V_{DARK} - V_{BRIGHT}) * (C_{SAMPLE} / (C_{SAMPLE} + C_{PARASIT} + C_{IN})) + (V_{OFFSET\_DARK} - V_{OFFSET\_BRIGHT}) * (C_{PARASIT} / (C_{SAMPLE} + C_{PARASIT} + C_{IN})) * C_{FB} / C_{IN}$$

Figure 3:
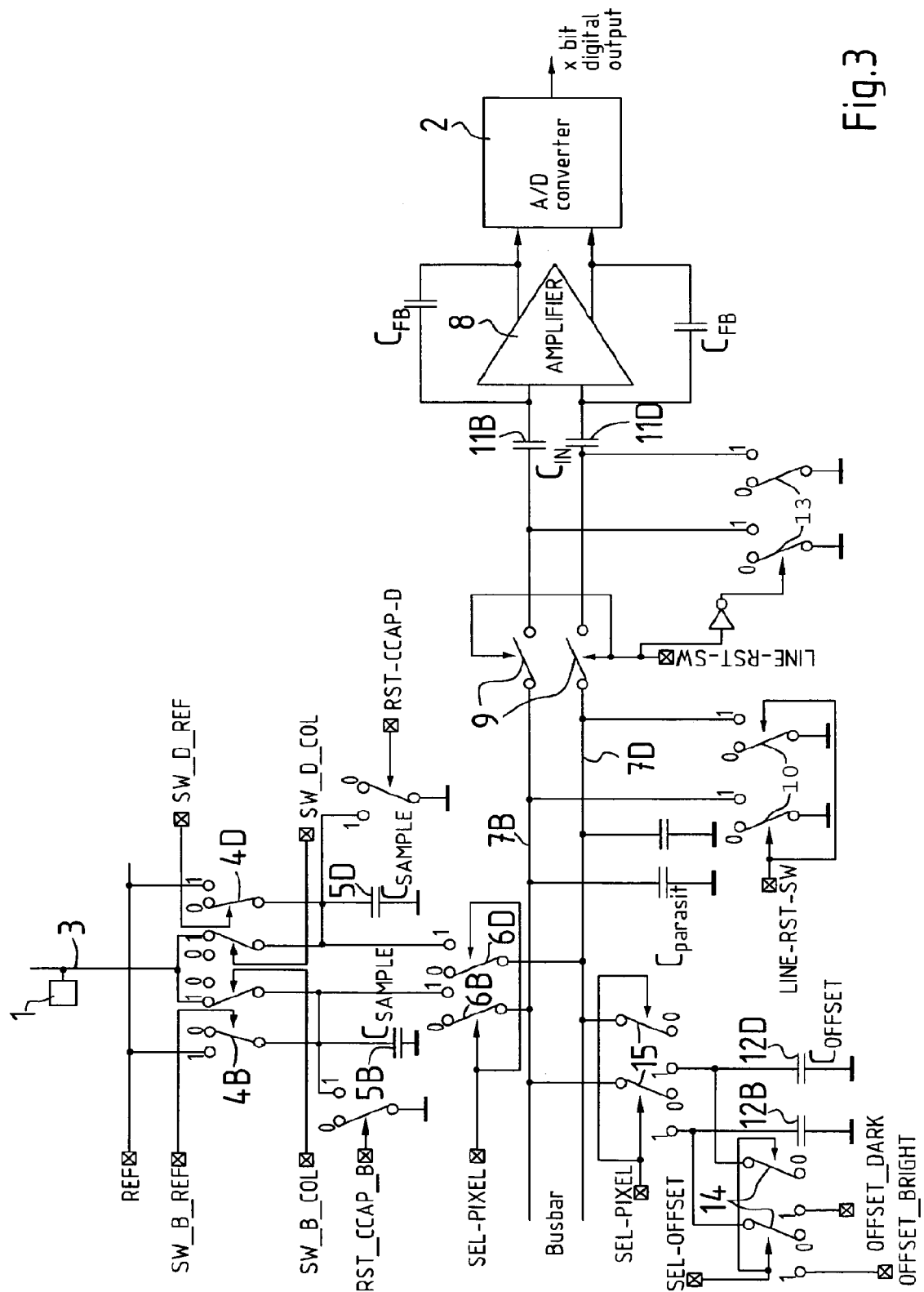

The embodiment of FIG. 3 is distinguished from that of FIG. 1 in that the offset capacitors 12B, 12D have one electrode connected to ground, and another electrode connected to offset signals OFFSET_BRIGHT, OFFSET_DARK, respectively, by switches 14, and to bus bar conductors 7B, 7D by switches 15 controlled by the signal SEL_PIXEL. By setting signal SEL_OFFSET=1, the offset capacitors 12B, 12D are charged with offset voltages OFFSET_BRIGHT, OFFSET_DARK. When the offset capacitors 12B, 12D have been charged, SEL_OFFSET turns to zero, and the switches 14 open, isolating the capacitors from the offset signals. Using the SEL_PIXEL signal both the storage capacitors 7B, 7D and the offset capacitors 12B, 12D are connected to bus bar conductors 7B, 7D, respectively. By charge distribution the voltage between the bus bar conductor 7B, 7D becomes the offset shifted differential voltage of the bright and dark pixel levels.

The advantage of this embodiment is that no additional input capacitance to the switch capacitance amplifier 8 is needed and the noise performance is improved. The voltage gain of this embodiment is lower than that of the embodiments shown in FIGS. 1 and 2, since the additional offset capacitors 12B, 12D increase the overall capacitance at the common node. The differential output voltage of the switched capacitor amplifier 8 is given by $$\Delta V_{OUT} = (V_{DARK} - V_{BRIGHT}) * (C_{SAMPLE} / (C_{SAMPLE} + C_{PARASIT} + C_{OFFSET} + C_{IN})) + (V_{OFFSET\_DARK} - V_{OFFSET\_BRIGHT}) * (C_{OFFSET} / (C_{SAMPLE} + C_{PARASIT} + C_{OFFSET} + C_{IN})) * C_{FB} / C_{IN}$$

Figure 4:
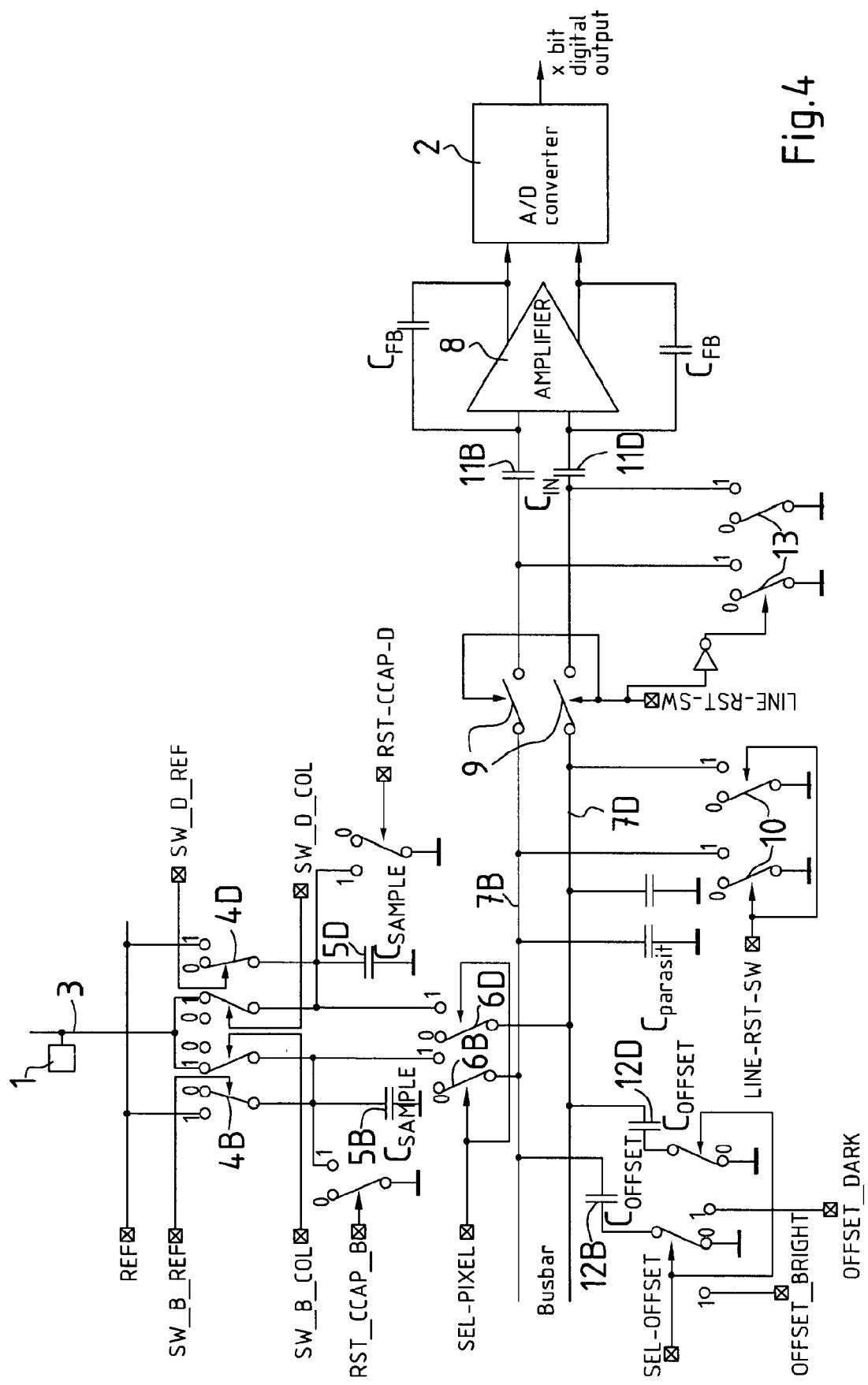

In the embodiment shown in FIG. 4 the two offset capacitors 12B, 12D are connected directly to the bus bar conductors 7B, 7D, i.e. the switches 15 of FIG. 3 are missing. After the bus bar is loaded with the two input signals from the pixel 1, signal SEL_OFFSET is switching from 0 to 1, thereby connecting one terminal of the offset capacitors 12B, 12D to respective offset terminals OFFSET_BRIGHT, OFFSET_DARK. This loads the backside of the offset capacitors 12B, 12D from GND to the differential offset voltage. As a result of this level shifting at the offset capacitors 12B, 12D, the capacitive node at the bus bar is also shifted and the two pixel input voltages from storage capacitors 5B, 5D are shifted, i.e. added an offset.

The differential output voltage of the switched capacitor amplifier is given by $$\Delta V_{OUT} = (V_{DARK} - V_{BRIGHT}) * (C_{SAMPLE} / (C_{SAMPLE} + C_{PARASIT} + C_{OFFSET} + C_{IN})) + (V_{OFFSET\_DARK} - V_{OFFSET\_BRIGHT}) * (C_{OFFSET} / (C_{SAMPLE} + C_{PARASIT} + C_{OFFSET} + C_{IN})) * C_{FB} / C_{IN}$$

This result is similar to the one described for the embodiment shown in FIG. 3. The advantages and disadvantages are also the same.

Figure 5:
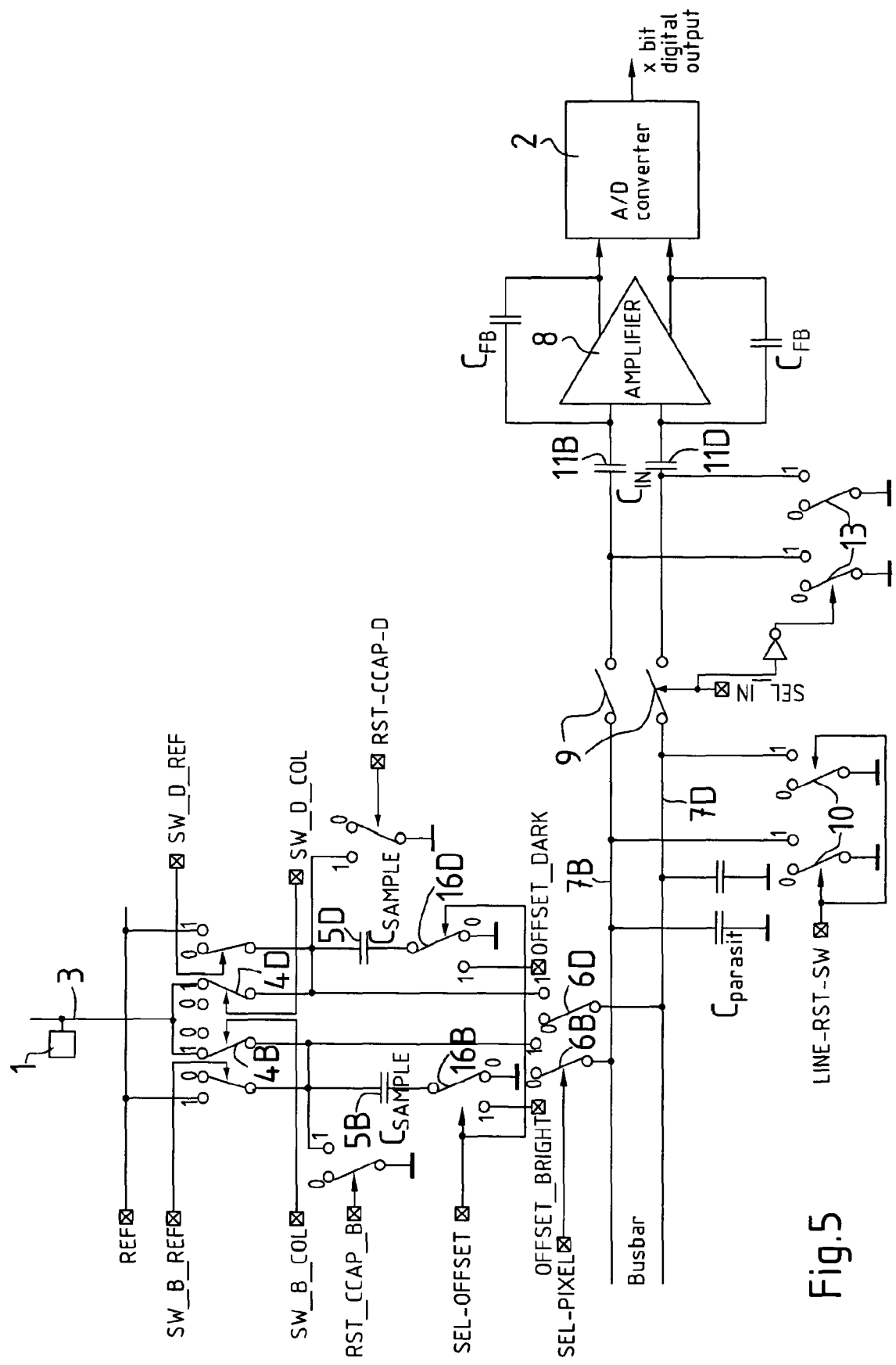

In the embodiment shown in FIG. 5 the backsides of the storage capacitors 5B, 5D are connected to switches 16B, 16D, by which offset signals OFFSET_BRIGHT, OFFSET_DARK can be applied to said backsides. If signal pixel outputs (bright and dark) are sampled on storage capacitors 5B, 5D (i.e. while column select signals SW_B_COL=1 and SW_D_COL=1 are applied to switches 4B, 4D, respectively), the backsides of the capacitors 5B, 5D are at GND (SEL_OFFSET=0). When SW_B_COL and SW_D_COL return to 0, the capacitors 5B, 5D are floating. Switching SEL_OFFSET to 1 connects the external offset voltages OFFSET_BRIGHT, OFFSET_DARK to the backsides of the capacitors 5B, 5D. The bright and dark pixel 1 output signals held at the front sides of storage capacitors 5B, 5D are thus shifted by OFFSET_BRIGHT, OFFSET_DARK, respectively. When SEL_PIXEL turns to 1, the storage capacitors 5B, 5D have their front sides connected to the bus bar, charging the parasitic capacitance thereof. When SEL_IN becomes 1, switches 13 close, and the shifted pixel output signals are applied to the input capacitors 11 of the switch capacitor amplifier 8. The differential output voltage of the switched capacitor amplifier 8 is given by $$\Delta V_{OUT} = (V_{DARK} - V_{BRIGHT}) * (C_{SAMPLE} / (C_{SAMPLE} + C_{PARASIT} + C_{IN})) + (V_{OFFSET\_DARK} - V_{OFFSET\_BRIGHT}) * (C_{SAMPLE} + C_{PARASIT} + C_{IN})) * C_{FB} / C_{IN} = (V_{DARK} - V_{BRIGHT} + V_{OFFSET\_DARK} - V_{OFFSET\_BRIGHT}) * (C_{SAMPLE} / (C_{SAMPLE} + C_{PARASIT} + C_{IN})) * C_{FB} / C_{IN}$$

The advantage of this embodiment is that no extra offset capacitors are needed and the passive gain of the capacitive network is not reduced. Furthermore by sampling the voltages OFFSET_BRIGHT, OFFSET_DARK on storage capacitors 5B, 5D the gain is higher than by sampling on $C_{PARASIT}$ because the storage capacitors 5B, 5D are usually larger than the parasitic capacitances. Therefore the offset range is increased.

The invention allows for the full input range of standard A/D converters to be used. Doubling the used input voltage range results in an increase in effective resolution of more than one bit at the output of the A/D converter.

The embodiments described above allow for the dark and bright values to be sampled and subtracted from each other in the analogue domain. It is to be noted that the bright value is not an absolute bright value. Rather, the relative voltage difference between bright value and dark value is used for further signal processing. In known image sensor arrangements, this subtraction, also known as correlated double sampling, or CDS, is performed in the digital domain, i.e. after A/D conversion. The sampling of the dark and the bright values is performed sequentially and only then the subtraction can be performed in the digital domain.

As according to the invention subtraction is performed in the analogue domain, prior to A/D conversion, only one value has to be A/D-converted instead of two as known from the prior art. Hence, the required time for A/D conversion is reduced. An amplifying step may be present before A/D conversion. In this case a differential amplifier is provided between the output of the pixel and the A/D converter.

A further advantage of the inventive circuit and the corresponding method for controlling the sensor arrangement resides in reduced offset voltages for different pixel cells and a reduced fixed pattern noise. The differential structure of the amplifier and A/D converter chain also avoids or reduces common mode noise and crosstalk.

In the known 3T pixel approach using three transistors per pixel cell the pixel cell has no capacitive node to store the dark voltage level at the beginning of the integration time, and to keep it until the end of the integration time. Therefore it is not possible to subtract the dark value of a given integration cycle n from the bright value of said same cycle n. Rather, only the dark value of the next integration cycle (n+1) is available after reset. By subtracting the bright value of cycle n and the dark value of cycle n+1, as known from the prior art, only the fixed pattern noise is removed, but not time depending noise components. However, the invention can also be used in 4T pixel cells, or pixel cells having even higher number of transistors, in which the dark value can be stored prior to the start of the integration time. For these types of image sensor ICs the reduction of kTC noise is effective also for higher frequencies.

Figure 6:
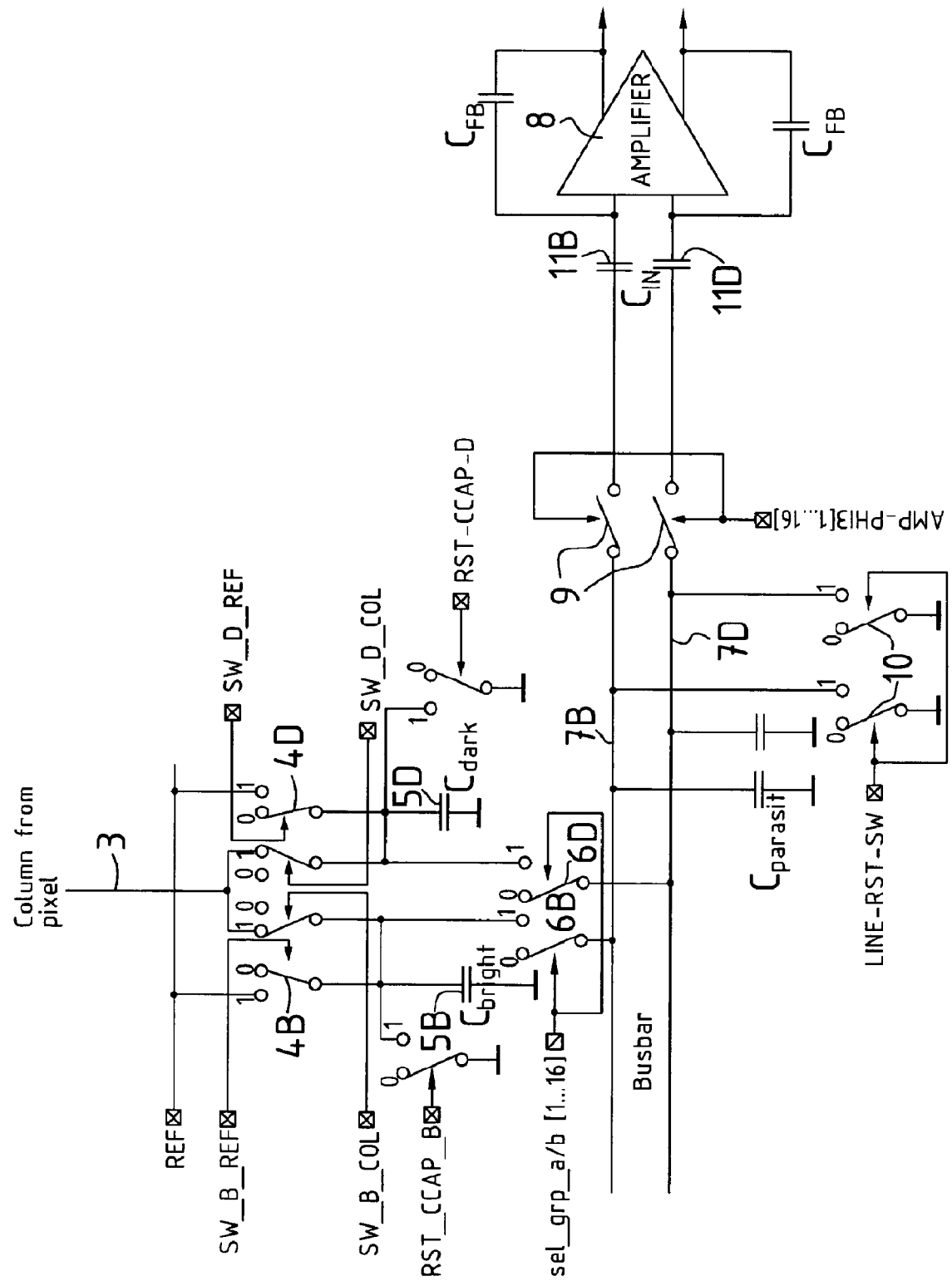
Figure 7:
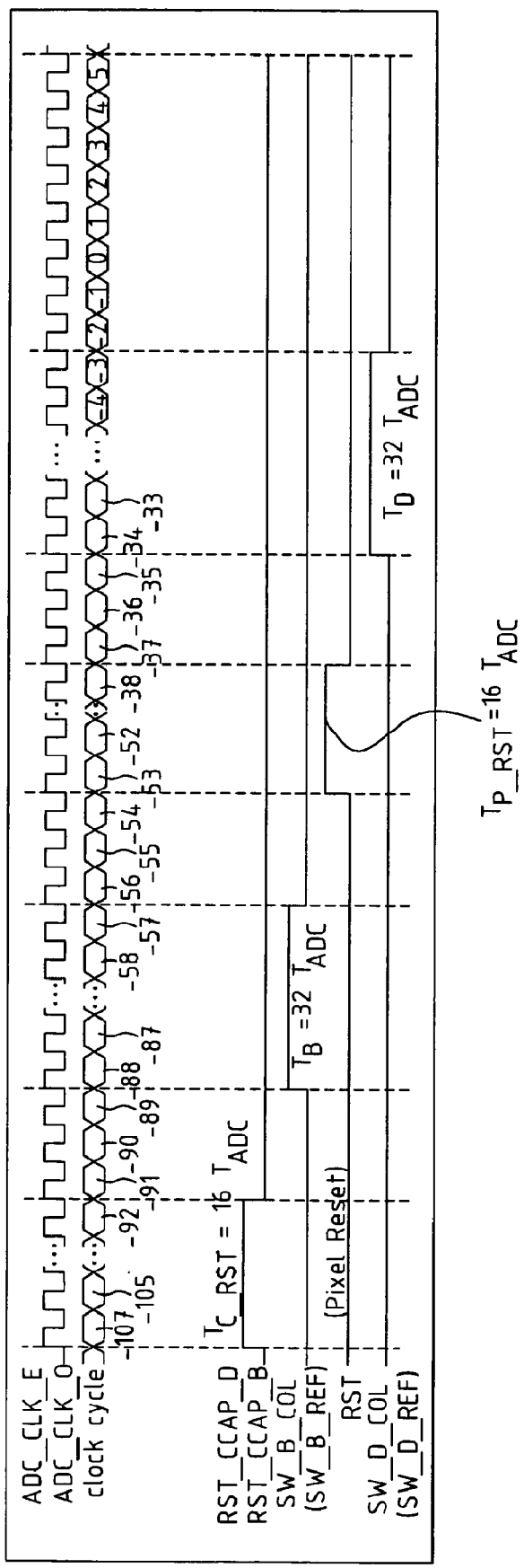
FIG. 7 is a timing diagram of the signals according to an embodiment of the invention.

The method is exemplarily described for a circuit as shown in FIG. 6. However, the method may also be applied correspondingly to the other circuits shown in FIGS. 1 to 5. The signals shown in the timing diagram of FIG. 7 indicate the different operations performed in different phases when performing a line readout according to the invention.

Signals RST_CCAP_D and RST_CCAP_B are resetting the sampling capacitors 5B, 5D from a previous value to GND. During the next phase (SW_B_COL=1) the output of the pixel is connected to 5B, and the bright value for integration cycle n is stored. In the next phase the pixel 1 is reset by signal RST. The output of the pixel 1 assumes the dark level value. During the following phase (SW_D_COL=1) the dark value for integration cycle n+1 is stored on 5D. In this way bright and dark values of a complete line of pixels of the image sensor array are stored on the respective capacitances 5B, 5D associated to different column lines 3.

During the readout phase these capacitances 5B, 5D are consecutively connected to a bus bar system which may comprise one or more pairs of bus bar conductors 7B, 7D by signals sel_grp_a/b[1, . . . 16]. Each pair of bus bar conductors 7B, 7D is connected to a switch-capacitance amplifier 8. The dark and bright values of the pixels are connected to the input capacitances 11B, 11D of the amplifier 8, as described above for the embodiments shown in FIGS. 1 to 5. After amplification the output of the amplifier 8 is proportional to the difference between the dark and bright voltage levels multiplied by the gain of the amplifier.

In the examples above, all switching signals are assumed to be positive logic signals, i.e. a high level, or "1" results in closing the switch. It is, however, also possible to use an inverted logic, or to use both, positive and negative, logic in a mixed manner.

The invention reduces the noise created in the CDS stage and provides an increased speed of the overall readout circuit. The increase in the speed of the readout circuit allows for an increase in the number of pixels in a matrix, which is a keyfeature for high definition imaging.

The invention claimed is:

1. An image sensor circuit comprising:
   at least one pixel cell for providing an output signal that varies between a maximum and a minimum magnitude in response to illumination of the at least one pixel cell during an exposure period;
   a first storage capacitor selectively coupled to the at least one pixel cell and storing a first image signal corresponding to a first output signal of the at least one pixel cell;
   a second storage capacitor selectively coupled to the at least one pixel cell and storing a second image signal corresponding to a second output signal of the at least one pixel cell;
   wherein the magnitude of the first output signal is equal or higher than the magnitude of the second output signal;
   a switching arrangement selectively and simultaneously connecting the first and second storage capacitors to respective differential inputs of a fully differential analog-to-digital converter via a differential bus bar;
   a first and a second offset signal source providing a first and a second offset signal having a magnitude between said minimum and maximum magnitudes, the first and second offset signals being selectively coupled to first and second lines of the differential bus bar upstream of the fully differential analog-to-digital converter, for offsetting the first and second image signals, respectively, at the corresponding inputs of the fully differential analog-to-digital converter, wherein the first and the second offset signals are selected to offset the first and second image signals in such a way that the full input range of the analog-to-digital converter is exploited.

2. The image sensor circuit of claim 1, wherein a differential amplifier is arranged between the differential bus bar and the fully differential analog-to-digital converter.

3. The image sensor circuit of claim 1, wherein the first and second offset signal sources are switchably connected to corresponding offset capacitors, which capacitors are coupled to the differential bus bar.

4. The image sensor circuit of claim 1, wherein the first and second offset signal sources are capacitively coupled to the inputs of the fully differential analog-to-digital converter and/or the differential amplifier.

5. The image sensor circuit of claim 1, wherein the first and second offset signal sources are switchably connected to the first and second storage capacitors.

6. The image sensor circuit of claim 5, wherein a respective first electrode of said first and second storage capacitor is connected to the pixel cell and wherein a switch arrangement is provided for connecting a respective second electrode of said first and second storage capacitor to the first and second offset signal source, respectively.

7. The image sensor circuit of claim 1, wherein a switch arrangement is provided for connecting a respective electrode of a first and second offset capacitor either to the first and second offset signal source, respectively, or to the bus bar.

8. The image sensor circuit of claim 1, wherein a switch arrangement is provided for connecting a respective first electrode of the first and second offset capacitor to the first and second offset signal sources, respectively, and for connecting a respective second electrode of the first and second offset capacitor to the bus bar.

9. The image sensor circuit of claim 1, wherein at least one calibrating pixel cell is provided, which provides a corresponding calibration signal at one of said maximum or minimum magnitudes irrespective of an illumination of the image sensor and which calibration signal is added to the offset signal.

10. The image sensor circuit of claim 1, wherein the first image signal and the first offset signal, and the second image signal and the second offset signal, respectively, are added upstream of the inputs of the fully differential analog-to-digital converter, in capacitances connected to the differential bus bar.

11. The image sensor circuit of claim 10, wherein a passive capacitance network is provided for adding.

12. The image sensor circuit of claim 1, wherein capacitors are provided that couple the differential bus bar and the inputs of the fully differential analog-to-digital converter.

* * * * *